(12) United States Patent
Olson

(10) Patent No.: US 8,684,648 B2
(45) Date of Patent: *Apr. 1, 2014

(54) FASTENING SYSTEM FOR ASSEMBLING PANELS OF DISSIMILAR MATERIALS

(75) Inventor: Barry D. Olson, Williamsville, NY (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,184

(22) Filed: Apr. 6, 2012

(65) Prior Publication Data

US 2013/0149069 A1 Jun. 13, 2013

Related U.S. Application Data

(60) Provisional application No. 61/474,935, filed on Apr. 13, 2011.

(51) Int. Cl.
*F16B 43/02* (2006.01)

(52) U.S. Cl.
USPC .......................................... 411/546; 411/368

(58) Field of Classification Search
USPC ................................................ 411/368, 546
See application file for complete search history.

(56) References Cited

U.S. PATENT DOCUMENTS

| | | | | |
|---|---|---|---|---|
| 1,778,346 | A * | 10/1930 | Zeidler | 30/349 |
| 2,982,573 | A * | 5/1961 | Mckee, Jr. | 411/542 |
| 3,588,133 | A * | 6/1971 | Caserta | 411/542 |
| 4,715,756 | A | 12/1987 | Danico et al. | |
| 5,205,692 | A | 4/1993 | Kelbert et al. | |
| 5,618,145 | A * | 4/1997 | Kuo | 411/432 |
| 5,662,444 | A * | 9/1997 | Schmidt, Jr. | 411/369 |
| 6,027,293 | A | 2/2000 | Beemer et al. | |
| D451,373 | S * | 12/2001 | Shinjo et al. | D8/397 |
| 2013/0145715 | A1* | 6/2013 | Olson | 52/582.1 |
| 2013/0145716 | A1* | 6/2013 | Olson | 52/582.1 |

FOREIGN PATENT DOCUMENTS

| | | |
|---|---|---|
| JP | 63018614 U | 2/1988 |
| JP | 02105605 U | 8/1990 |
| JP | 2002122122 A | 4/2002 |
| JP | 2008051269 A | 3/2008 |

OTHER PUBLICATIONS

International Search Report, European Patent Office, Rijswijk, NL in PCT/2012/033205, PCT corresponding application, Andreas Poll, Authorized Officer, Jul. 5, 2012.

* cited by examiner

*Primary Examiner* — Roberta Delisle

(57) ABSTRACT

A fastening system for attaching cladding panels to a carrier panel and allowing for differential thermal expansion. The system fastens the two panels together at points in the direction perpendicular to the panel planes. A combination of different carrier panel hole sizes and slots fix the panels together at one point and allow the panels to expand and contract relative to each other while maintaining rectangular alignment. Wall panels and buildings constructed using the fastener are disclosed.

5 Claims, 2 Drawing Sheets

FASTENING SYSTEM FOR ASSEMBLING PANELS OF DISSIMILAR MATERIALS

BACKGROUND OF THE INVENTION

Field of Invention

This invention relates to a fastening system for attaching panels of one material to a panel of a dissimilar material.

CROSS-REFERENCE TO RELATED APPLICATIONS

Subject matter disclosed herein is disclosed in the following copending applications filed contemporaneously herewith and assigned to the assignee of the present invention:
Wall Panels of Dissimilar Materials (CN-1101);
Building with Panels of Dissimilar Materials (CN-1102); and
Method for Assembling Panels of Dissimilar Materials (CN-1103).

BACKGROUND OF THE INVENTION

It is known to attach panels of dissimilar materials together by using adhesive bonding, such as silicone adhesives. Adhesive bonding is problematic in that typical adhesives have low static load strengths, leading to adhesive failure and separation of the panels. Typical adhesives used in the building industry have a modulus of elasticity which allows unacceptable movement between panels. Simple mechanical fasteners do not allow for movement due to differential expansion and contraction between panels of dissimilar materials.

There is a need for a fastening system to fasten two panels of dissimilar materials, e.g., aluminum and filled acrylic composite, in such a way that differential growth of one panel relative to the other does not cause warping of either panel. There is also a need for a fastening system that can be assembled with access to only the backside of one panel.

SUMMARY OF THE INVENTION

An embodiment of the invention is a fastening system for panels of dissimilar materials, which comprises a threaded fastener, a captive nut with a through hole which is formed from a flat body with a first face; a shoulder protruding from the first face; a polygonal extension protruding from the shoulder; and a captive washer comprising a washer body; and a polygonal cutout sized to fit the said polygonal extension.

In another embodiment, slotted holes in a first panel allow both panels to expand and contract relative to each other while maintaining rectangular alignment.

In another embodiment, a wall panel is constructed from the assembly of an aesthetic panel and a carrier panel fastened together by the fastening system for panels of dissimilar materials.

In another embodiment, a building is constructed with wall panels constructed from the assembly of an aesthetic panel and a carrier panel fastened together by the fastening system for panels of dissimilar materials.

DETAILED DESCRIPTION

Figure 1:
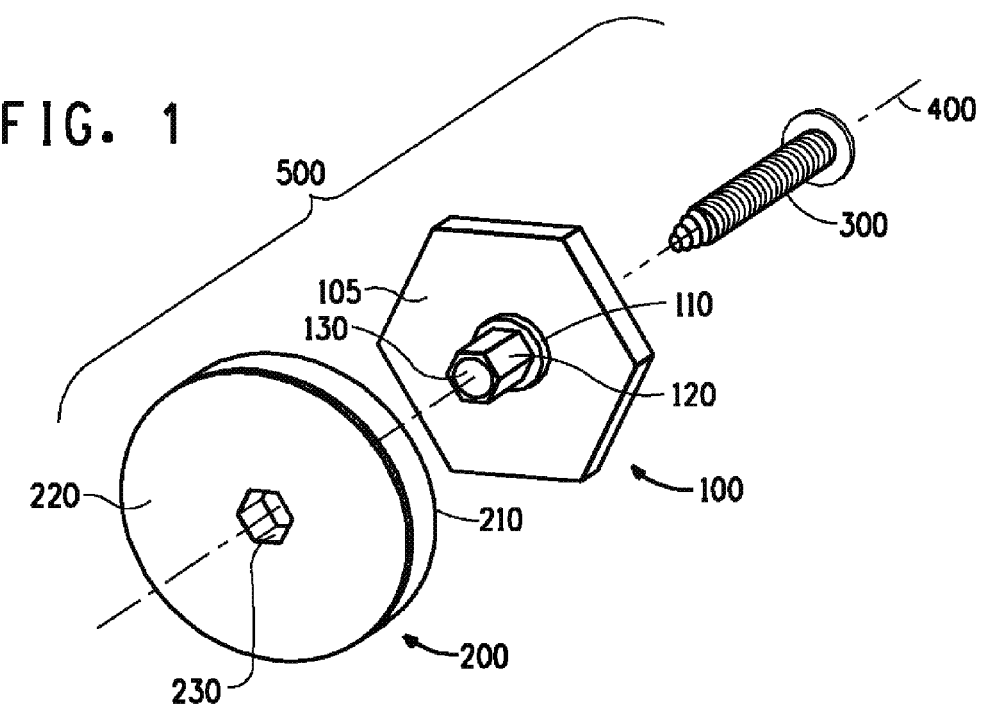
FIG. 1 shows an exploded view of the fastening system.
Figure 2A:
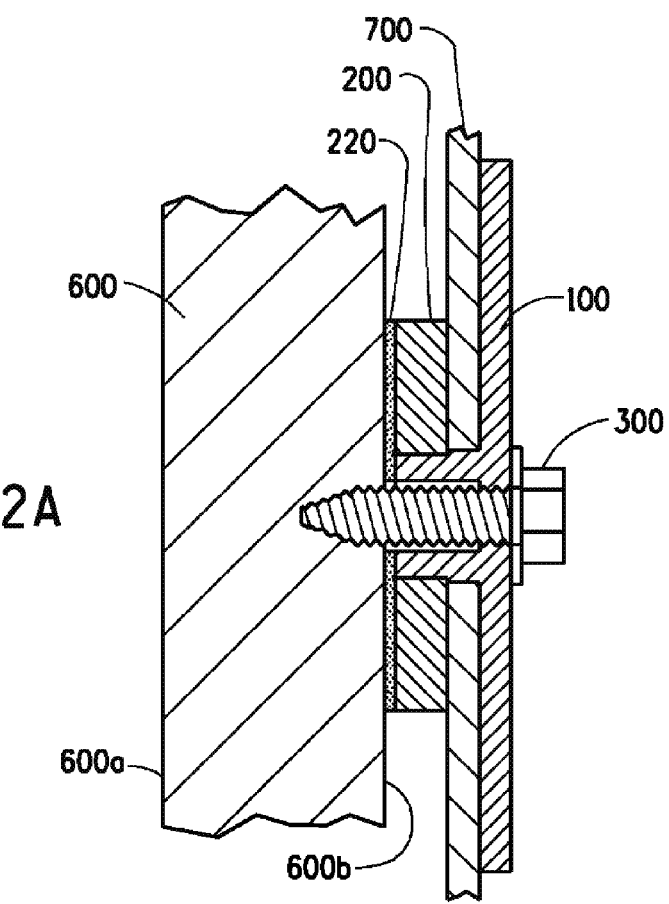
FIG. 2A shows a wall panel assembled with the fastening system and two panels of dissimilar materials.
Figure 2B:
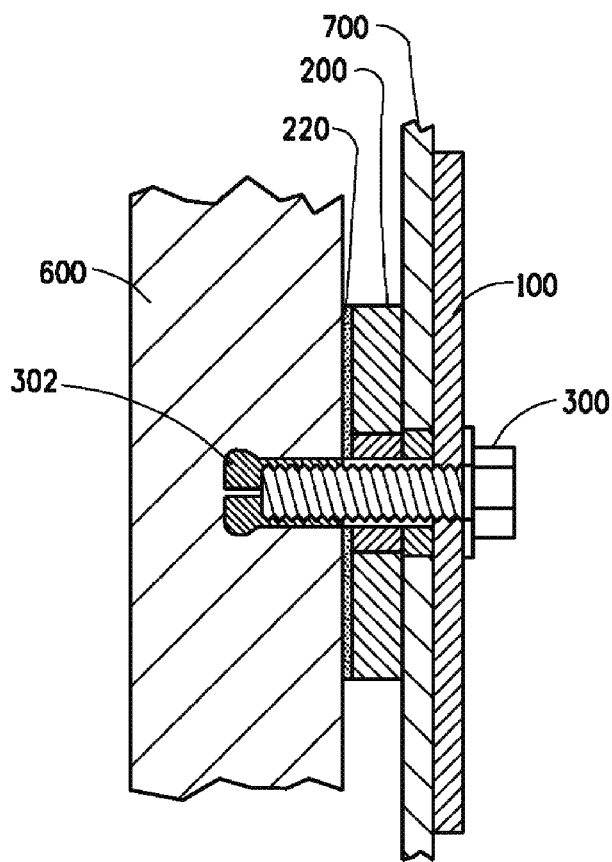
FIG. 2B shows a wall panel assembled with the fastening system and two panels of dissimilar materials employing an optional anchor.

The present invention is not limited to fastening any specific type of panels to one another for any specific application. The fastening system of the present invention may be used for panels of such materials as wood, stone, metal or plastic. It is found to be especially useful for fastening panels of an aesthetic material to a support panel for use as building cladding. For purposes of illustration, one panel will be called an aesthetic panel (600), and the other will be called a carrier panel (700).

Panel Fastening System

The panel fastening system (500) is comprised of three components, a captive nut (100), a captive washer (200), and a threaded fastener (300). The components may be made of metal, or some other suitably strong and durable material, using standard manufacturing methods. Preferred materials are aluminum or an engineering plastic.

Captive Nut

The captive nut (100) comprises four integral components, a main body (105), a shoulder (110), an extension (120), and a through hole (130). In a preferred embodiment, the captive nut will be a unitary member machined from one piece of material, wherein each component will extend out from one side of the main body (105), i.e., the shoulder will commence at the face of the main body and extend therefrom, and the polygonal extension will commence at the shoulder and extend therefrom. However, the captive nut components may be manufactured individually and then assembled to form the captive nut as shown in FIG. 1. The four components as shown in FIG. 1 share a centerline (400), but there is no limitation in the present invention for a centerline.

The main body (105) may be formed in any shape that allows an installer to hold it in a manner to prevent rotation during installation. In general, the main body will be a flat shape that can be grasped by a handtool, such as a pliers or wrench. FIG. 1 illustrates the main body of the captive nut with an outer surface in the shape of a hexagon, which is the preferred shape. The hexagon shape allows the captive nut to be held with a conventional wrench. The other integral components of the captive nut will not rotate when the main body is held captive.

The shoulder (110) on the captive nut establishes a controlled-dimension gap between the captive nut and captive washer (200) when they are assembled to fasten to a carrier panel (700). The gap dimension is selected to be a slip fit for the carrier panel held between the captive nut and captive washer. The shoulder extends from a face of the main body.

The polygonal extension (120) is a polygonal shape that extends from the shoulder (110). It is sized to fit into the cutout (230) in the captive washer (200), to be discussed below. The extension may be of any polygonal shape that will not rotate inside of a correspondingly shaped hole. The polygon may be formed from straight sides, curvilinear sides, or a combination thereof. When the extension of the captive nut is mated with the cutout of the captive washer both the captive washer and the captive nut are prevented from rotation when the main body is held captured by a wrench. This allows the fastening system to be assembled with access to only the backside of the carrier panel (700). For purposes of illustration, a hexagon shaped extension and cutout are used.

A through hole (130) commences on a face of the captive nut opposite that from which the shoulder and polygonal extension extend, and runs through the entirety of the combined main body, shoulder, and polygonal extension. The through hole provides a means for a threaded fastener (300) to pass through the captive nut and fasten to a panel (600).

Captive Washer

A captive washer (200) comprises a washer body (210), and a polygonal cutout (230). A function of the captive washer, along with the captive nut, is to form a gap that is a slip fit for a carrier panel (700) held between the captive nut and captive washer. The captive washer also establishes a space between the two panels, which lowers friction between them and allows free movement due to differential expansion and contraction.

A purpose of the washer body (210) is to distribute the pressure of the threaded fastener (300) evenly over the carrier panel (700), reducing the chance of damage thereto. The shape of the washer body is not critical. A generally annular shape is preferred.

The cutout (230) is a polygonal-shaped through hole in the washer body. The shape and size is a sliding fit for the extension (120). It is critical that the cutout matches the extension and be of a geometry that prevents the extension from rotating inside the cutout.

Optionally, a resilient washer (220) that serves as a spring while the threaded fastener (300) is being tightened may be employed. Any resilient washer, such as, split washers, Bellville washers, wavy washer, and star washers may be used. Preferably, a foam washer may be used between the face of the washer body (210) and the panel (600). In a preferred embodiment, the foam washer is adhesively bonded to the washer body (210) for ease of installation.

Threaded Fastener

Any threaded fastener (300) suitable for the panel (600) into which the threaded fastener will be driven may be used. In embodiments where the panel does not readily accept a threaded fastener, an anchor (302) may be used. An example of suitable anchors are those supplied by Fischer Fastening Systems of Auburn Hills, Mich., and the undercut anchors supplied by KEIL Befestigungstechnik GmbH of Engelskirchen, Germany.

Optional Slots in Carrier Panel

Figure 3A:
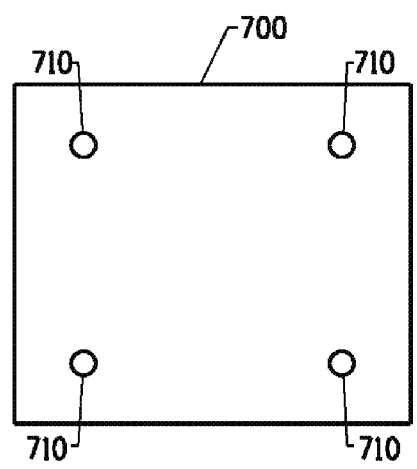
FIG. 3A shows a carrier panel with through holes.
Figure 3B:
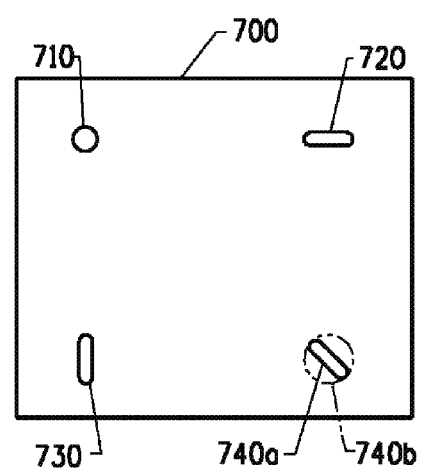
FIG. 3B shows a carrier panel with through holes and slots.

The present invention requires through holes (710) in the carrier panel to allow the threaded fastener to penetrate through the carrier panel into the aesthetic panel. There is no limitation on the size, shape, or number of through holes used. It is found useful to use a combination of circular holes and oblong slots to allow controlled movement between the dissimilar panels while maintaining rectangular alignment. As illustrated in FIG. 3, through holes of different sizes, and slots may be included in carrier panel (700) at locations where threaded fasteners will pass through the carrier panel. At one point a reference hole (710) is sized to fit close around the outer diameter of a captive nut shoulder (110). This point connection becomes a fixed connection point between the panels.

Panel slots (720, 730, 740a) are used at the corners of the carrier panel. The panel slots are elongated in the direction coincident with the slot's position from the reference hole. Consequently, as the aesthetic panel expands or contracts relative to the carrier panel the slots will allow unconstrained linear movement between the dissimilar panels. Optionally, a larger diameter hole (740b) may be used at the corner diametrically opposite the reference hole. The combination of through holes and panel slots allow the panels to move relative to each other while maintaining alignment.

Fastening System Installation

The present invention is not limited to fastening any specific type of panels to one another for any specific application. For purposes of illustrating the installation of the fastening system, a first panel known as an aesthetic panel (600), will be fastened to a second panel known as a carrier panel (700). Through holes (710) are provided in the carrier panel to allow the threaded fastener (300) to fasten the aesthetic panel to the carrier panel.

As a first step in installing the fastening system, provision is made for the threaded fastener (300) to thread into the aesthetic panel (600). The threaded fastener may be driven directly into the aesthetic panel in situations where the material of the aesthetic panel readily accepts screw threads. In situations where the material of the aesthetic panel may crack, a blind pilot hole may be drilled into the back surface (600b) of the aesthetic panel. When simple threaded fasteners are either impractical or ineffective, a screw anchor (302) may be used. The screw anchor is installed into the back surface of the aesthetic panel (600b) according to the manufacturer's instructions and specifications. Threaded fasteners should not penetrate through the front surface of the aesthetic panel (600a) so as to maintain the aesthetic appeal of the panel.

The captive washer (200) is positioned on the aesthetic panel with the cutout (230) aligned with the point on the carrier panel where the threaded fastener (300) will be driven. The carrier panel (700) is positioned opposite the aesthetic panel in a position where a through hole in the carrier panel (710) is aligned with the captive washer. A captive nut (100) is inserted into the through hole in a manner which mates the polygonal extension (120) and the cutout (230). The threaded fastener (300) is inserted through the through hole (130) in the captive nut (100). A wrench is placed on the main body (105) to prevent the fastening system from spinning and the threaded fastener is driven into the aesthetic panel.

Application in Building Construction

The present invention is not limited to fastening any one specific type of panel to any other type of panel, for any specific application. The fastening system of the present invention may be used for any combination of panels of such materials as wood, stone, metal or plastic. For purposes of illustration it is found to be especially useful for fastening a first panel of an aesthetic material to a second, supporting, carrier panel for use as building cladding. The carrier panel is typically a structural metal wall panel. An example of a structural metal wall panel is the Dri-design Wall Panel System from Dri-Design of Holland, Mich. Two or more holes are drilled into a structural metal wall panel that are utilized as the carrier panel (700). A threaded fastener (300) is fit through a captive nut (100), and then through a hole in the carrier panel. A captive washer is placed on the threaded fastener on the opposite side of the carrier panel and assembled to the captive nut by mating the extension (120) on the captive nut to the cutout (230) on the captive washer. The threaded fastener is then driven into the aesthetic panel to fasten the carrier panel to the aesthetic panel to form a wall panel. It is found useful to prevent the captive nut and captive washer from spinning while the threaded fastener is driven into the aesthetic panel by holding the main body (105) with a wrench.

It is found that an aesthetic panel of solid surface material will give a pleasing appearance and good weathering characteristics. Corian® solid surface from DuPont of Wilmington, Del. is an example of an acceptable solid surface material.

Numerous wall panels, formed from aesthetic panels fastened to carrier panels, are assembled to the exterior structure of a building to create walls.

The following examples further illustrate the invention.

EXAMPLE

An aesthetic panel made of Corian® solid surface material was placed on a workbench surface with the finished side face-down on the work surface. The Corian® panel had previously had undercut holes for Keil anchors machined into the back face. Consequently, these undercut holes were exposed on the backside of the Corian® panel. Keil anchors were inserted in each of the undercut holes.

Captive washers were positioned on each Keil anchor with the cutout in the captive washers capturing the extension of the Keil anchor. The captive washers were positioned so the resilient washer adhered to one face of the captive washers was between the captive washers and the backside of the Corian® panel. The resilient washer was made of foam.

A mating Dri-Design aluminum carrier panel was then placed on top of the captive washers, with the holes and slots in the carrier panel aligned with the through holes in the captive washers.

A captive nut was then inserted through the single small diameter reference hole in the carrier panel with the captive nut extension inserted into the cutout in the captive washer. The position of the carrier panel was then slightly adjusted so the shoulder feature diameter of the captive nut was aligned with the carrier panel hole diameter so the captive nut shoulder was inserted into the panel hole and the shoulder face came into contact with the surface of the captive washers.

Captive nuts were then inserted through the carrier panel slots with captive nut extensions inserted into the cutouts in the captive washers. The position of the carrier panel was slightly rotated around the captive nut previously placed in the small diameter reference hole so the shoulder feature diameter of the captive nuts were aligned with the Dri-Design panel slot edges so the captive nut shoulders were inserted into the panel slots and the shoulder faces came into contact with the surface of the captive washers. Captive nuts were similarly inserted and aligned in all the slots along the two perpendicular axes of slots to complete the alignment of the two dissimilar panels.

Captive nuts were then inserted through the remaining large diameter carrier panel hole, with captive nut extensions inserted into the cutouts in the captive washers.

Bolts with a proper length to span the distance between the Keil anchors and the back face of the carrier panel were then dropped into the through holes of each captive nut. Each bolt was then threaded into the mating Keil anchor and tightened to the proper torque value, while holding the main body of the captive nut with a wrench.

What is claimed is:

1. A fastening system for panels of dissimilar materials, which comprises:
   (a) a threaded fastener:
   (b) a captive nut with a through hole comprising:
      (i) a main body with a first flat face;
      (ii) a shoulder protruding from the first flat face;
      (iii) a polygonal extension protruding from the shoulder;
   (c) a captive washer comprising;
      (i) a washer body; and
      (ii) a polygonal cutout sized to fit the said polygonal extension.

2. The fastening system of claim 1, further comprising a resilient washer adhered to the washer body.

3. The fastening system of claim 2, wherein the resilient washer adhered to the washer body is comprised of foam.

4. The fastening system of claim 1, wherein the polygonal extension and polygonal cutout are hexagons.

5. The fastening system of claim 1, wherein the main body is in the shape of a hexagon.

* * * * *